United States Patent [19]

Beardmore et al.

[11] Patent Number: 5,617,820

[45] Date of Patent: Apr. 8, 1997

[54] CONNECTING ROD FOR INTERNAL COMBUSTION ENGINE

[75] Inventors: John M. Beardmore, Howell; Bruce A. Tucker, Brighton; David N. Leland, Farmington, all of Mich.

[73] Assignee: General Motors Corporation, Detroit, Mich.

[21] Appl. No.: 544,302

[22] Filed: Oct. 17, 1995

[51] Int. Cl.[6] .................................................. G05G 1/00
[52] U.S. Cl. ........................ 123/197.3; 74/581; 74/579 E
[58] Field of Search .............................. 123/197.3, 197.4; 74/579 E, 579 R, 581, 584

[56] References Cited

U.S. PATENT DOCUMENTS

| | | |
|---|---|---|
| 1,385,785 | 7/1921 | Schultz . |
| 1,389,055 | 8/1921 | Kugler . |
| 1,766,024 | 6/1930 | Jones . |
| 1,903,064 | 3/1933 | Onstott . |
| 4,691,590 | 9/1987 | Geringer et al. .......................... 74/581 |
| 5,193,413 | 3/1993 | Kizler et al. .......................... 74/579 E |

*Primary Examiner*—Marguerite McMahon

*Attorney, Agent, or Firm*—Karl F. Barr, Jr.

[57] ABSTRACT

According to the present invention a connecting rod is defined by a longitudinally extending beam having, at a first end, a piston pin bearing boss and, at a second end, a crankpin bearing boss. The longitudinally extending beam includes an opening extending from a location near the piston pin bearing boss to a location near the crankpin bearing boss to define opposing webs or legs. Under loads imposed on the connecting rod during the combustion event, the opposing legs exhibit a resiliency which allows inward movement, towards the beam axis. The inward movement of the opposing legs absorbs a portion of the applied load, thereby reducing the amplitude of the force transferred to the crankpin. As the force of the combustion event diminishes through downward movement of the piston in the engine cylinder, the opposing legs move outwardly, away from the beam axis, returning to their original relationship. As the webs return to the starting position, the previously absorbed portion of the load applied to the connecting rod, by the combustion event, is transferred to the crankpin such that the total transmitted force is substantially the same as that of a typical connecting rod while the peak force amplitude is reduced.

5 Claims, 5 Drawing Sheets

CONNECTING ROD FOR INTERNAL COMBUSTION ENGINE

TECHNICAL FIELD

The present invention is directed to a connecting rod for internal combustion engines and, in particular, to a compliant connecting rod configured to reduce peak force amplitude.

BACKGROUND

Engine noise generated by the combustion process may be increased by engine technologies directed at improved combustion efficiency. Aggressive burn rates, for instance, may impart forces on the engine structure which limit the effectiveness of typical noise control measures. Historically, robust cylinder case structures and stiff crankshafts have been generally effective in controlling and reducing combustion dominant noise. While crankcase structural integrity is important in the design of high performance internal combustion engines, additional solutions are required to achieve acceptable noise and sound quality.

SUMMARY

Noise control measures typically involve attention to the source of generated noise, the path of the noise, the noise receiver or radiator. With the premise that it is undesirable to alter the source, in this instance the combustion process, the present invention focuses on the reduction, by absorption, of combustion energy in the piston/connecting rod path. A degree of compliance is introduced into the path which thereby effects a change in mechanical impedance along the path from the combustion chamber to the crankshaft. The connecting rod of the present invention modifies the sharp transient force input to these components thereby spreading the energy over a greater time period through a reduction in stiffness along the noise transmission path. Transmitted force has substantially the same "time-integral" with lower peak amplitudes as combustion energy is stored and returned to the powertrain over an extended period. By modifying the path of noise in the piston/connecting rod assembly, high frequency generated noise is reduced.

According to the present invention a connecting rod is defined by a longitudinally extending beam having, at a first end, a piston pin bearing boss and, at a second end, a crankpin bearing boss. The longitudinally extending beam includes an opening extending from a location near the piston pin bearing boss to a location near the crankpin bearing boss to thereby define opposing webs or legs. Under loads imposed on the connecting rod during the combustion event, the opposing legs exhibit a resiliency which allows inward movement, towards the beam axis. The inward movement of the opposing legs absorbs, and stores, a portion of the applied load, thereby reducing the amplitude of the force transferred to the crankpin. As the force of the combustion event diminishes through downward movement of the piston in the engine cylinder, the opposing legs move outwardly, away from the beam axis, returning to their original relationship. As the webs return to the starting position, the previously stored portion of the load applied to the connecting rod, by the combustion event, is transferred to the crankpin such that the total transmitted force is substantially the same as that of a typical connecting rod while the peak force amplitude is reduced.

The connecting rod of the present invention may include means for limiting the total flexation of the opposing beam legs by varying the cross section of the beam opening defining the legs. Through a reduction in the beam opening cross section, inward movement is positively limited by contact between the inner surfaces of the legs which define the walls of the beam opening.

These and other features, objects and advantages of the invention will be more apparent from the following detailed description and drawings.

DESCRIPTION OF THE PREFERRED EMBODIMENTS

Figure 1:
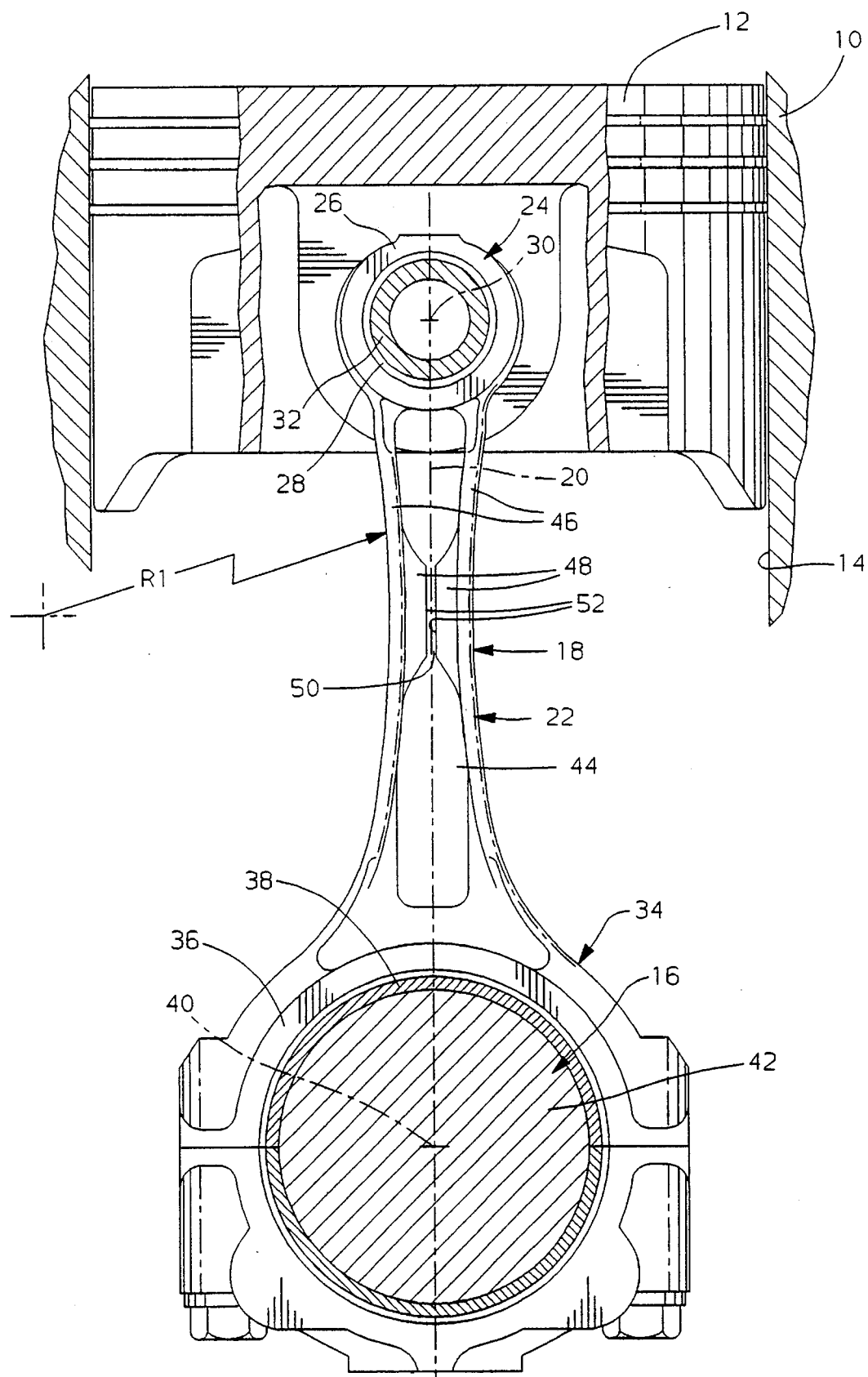
FIG. 1 is a partial, schematic view of an internal combustion engine which includes a connecting rod embodying features of the present invention.
Figure 2:
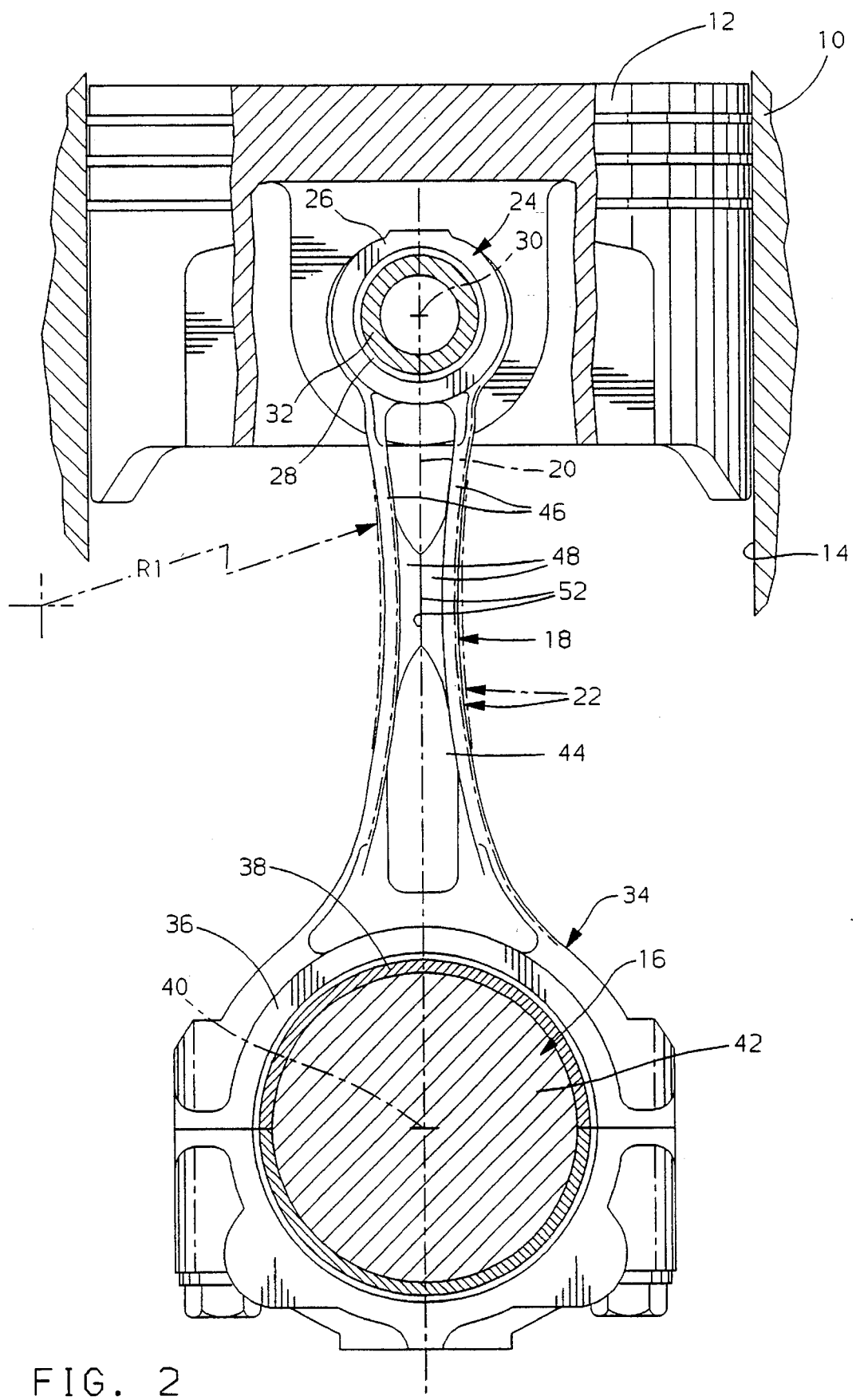
FIG. 2 shows the internal combustion engine of FIG. 1 in a second mode of operation.

Referring to FIG. 1, an internal combustion engine 10 includes a piston 12 disposed for reciprocal movement in a cylinder 14. The piston 12 is mechanically connected to a crankshaft 16 through a connecting rod, designated generally as 18. The connecting rod has a central longitudinal axis 20 defined by beam 22. At a first, longitudinal end 24, the connecting rod 18 has a piston pin bearing boss 26 with a bearing 28 centered on an axis 30 for receiving a piston pin 32 and, at its opposite, second longitudinal end 34 the connecting rod 18 has a crankpin bearing boss 36 with a bearing 38 centered on an axis 40 for receiving a crankpin 42 of a crankshaft. The beam 22 includes an opening 44 which extends from a location adjacent the piston pin bearing boss 26 to a location adjacent the crankpin bearing boss 36 to thereby define opposing webs or legs 46. As a result of the connecting rod construction just described, the connection between the piston pin and the crankpin, and thus the force transfer mechanism between the two components of the engine, is through the webs 46. Under compressive loading imposed on the connecting rod 18 during the combustion event, the opposing webs 46 introduce a component of resiliency into the mechanical linkage defined by the piston, connecting rod and crankshaft by moving inwardly, towards the longitudinal beam axis 20, as illustrated in FIG. 2. Such an inward movement of the legs 46 allows the mechanism to absorb a portion of the applied compressive load thereby effectively reducing the peak amplitude of the force transferred to the crankpin. The rate of flexation of the opposing beams webs 46 is varied through inwardly directed radius $R_1$. The curvature in webs 46 imposed by radius $R_1$ operates to vary the stiffness of the beam structure 22 and, as stiffness is dependent on the curvature, a more extreme curvature, in effect a curvature having a shorter radius $R_1$, will result in a connecting rod 18 having increased flexibility and force characteristics. As the force of the combustion event diminishes through the downward movement of the piston in the engine cylinder, the opposing webs 46 move outwardly, away from beam axis 20, returning to their original relative relationship. As the webs 46 return to their unloaded position, FIG. 1, the previously adsorbed portion of the compressive load stored by the connecting rod 18 is transferred to the crankpin 42 such that the total transmitted force is substantially intact, but applied over an extended period, while the peak force amplitude is reduced. Such a reduction in peak force amplitude is effective to reduce generated noise, FIG. 4.

In the preferred embodiment shown in FIGS. 1 and 2, overload protection, flex limiting stops 48 extend inwardly, towards the beam axis 20, to define a minimum cross section 50 in longitudinal opening 44. As compressive force is applied to the connecting rod 18, the inward movement of the webs 46 is limited by the closing of the stops 48 and resulting contact between the inner surfaces 52 thereof, preventing flexing of the webs 46 beyond desired limits, which could result in failure of the rod.

Figure 3:
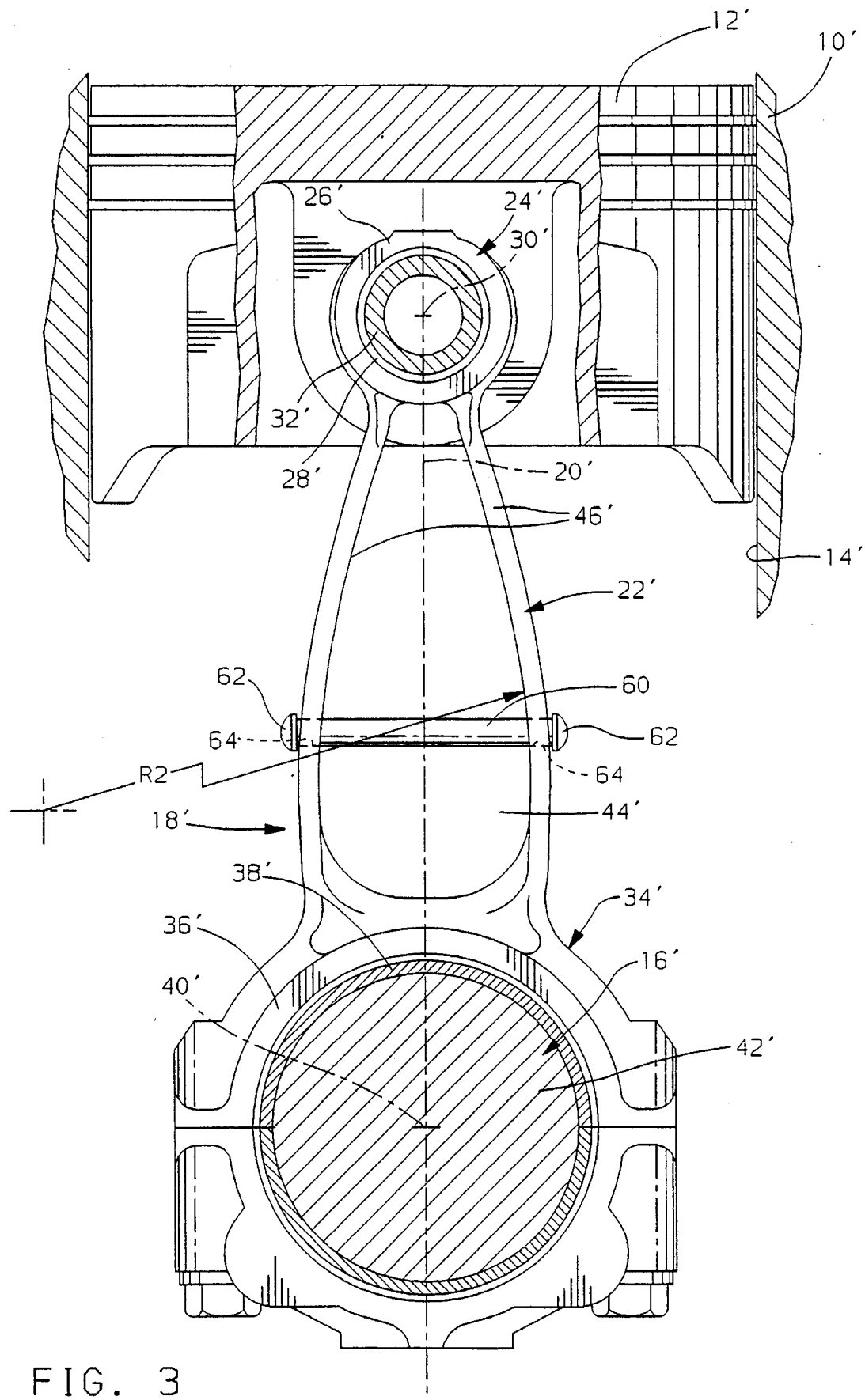
FIG. 3 illustrates an additional embodiment of the connecting rod of the present invention.

An additional embodiment of the connecting rod of the present invention is shown in FIG. 3, where features similar to those of the above described embodiment are represented by like numerals with a "primed" designation. The connecting rod 18' has a longitudinal axis 20' defined by a beam 22'. The beam includes central opening 44' which extends the length of the beam from a location adjacent the piston pin bearing boss 26' to a location adjacent the crankpin bearing boss 36' to define opposing webs 46'. In a manner similar to the above embodiment, the rate of flexation is determined by the radius of curvature $R_2$ of the webs 46'. In the embodiment of FIG. 3, the curvature of the webs is in an outward direction, away from longitudinal axis 20' of beam 22". The outward direction of flexation of the webs 46' lacks the inherent flex limiting feature of the flex limiting stops 48. As such, a flex limiter such as rod 60 having stops 62 at each end may be used to limit the outward movement of the rod webs 46' under compressive loading. The rod 60 extends, normal to longitudinal axis 20', through openings 64 in each of the webs 46' to essentially tie the webs 46' together and limit the outward movement thereof.

Figure 4:
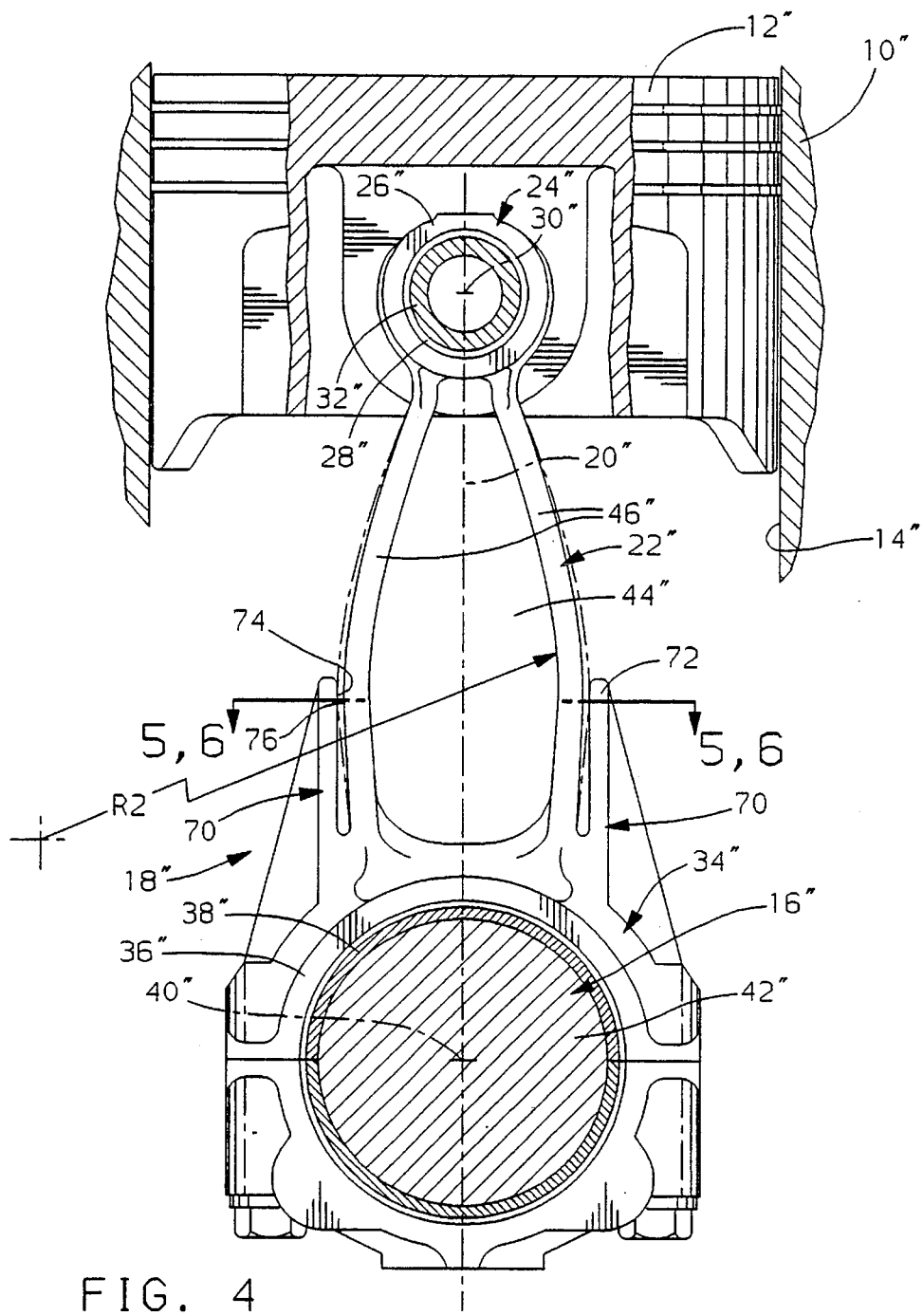
FIG. 4 illustrates an additional embodiment of the connecting rod of the present invention.
Figure 5:
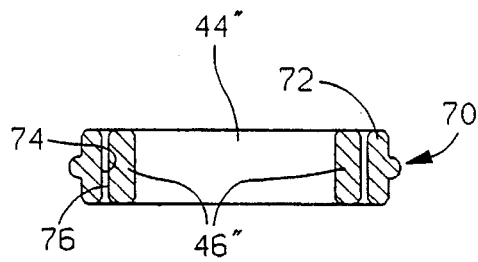
FIGS. 5 and 6 are sectional views taken at 5,6—5,6 which illustrate the connecting rod of FIG. 4 in different modes of operation.
Figure 6:
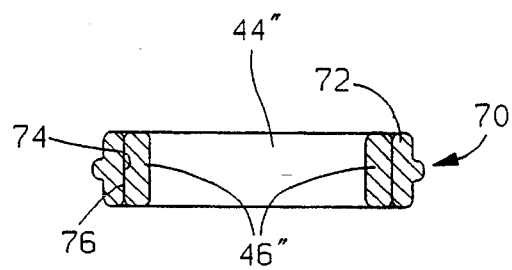
Figure 7:
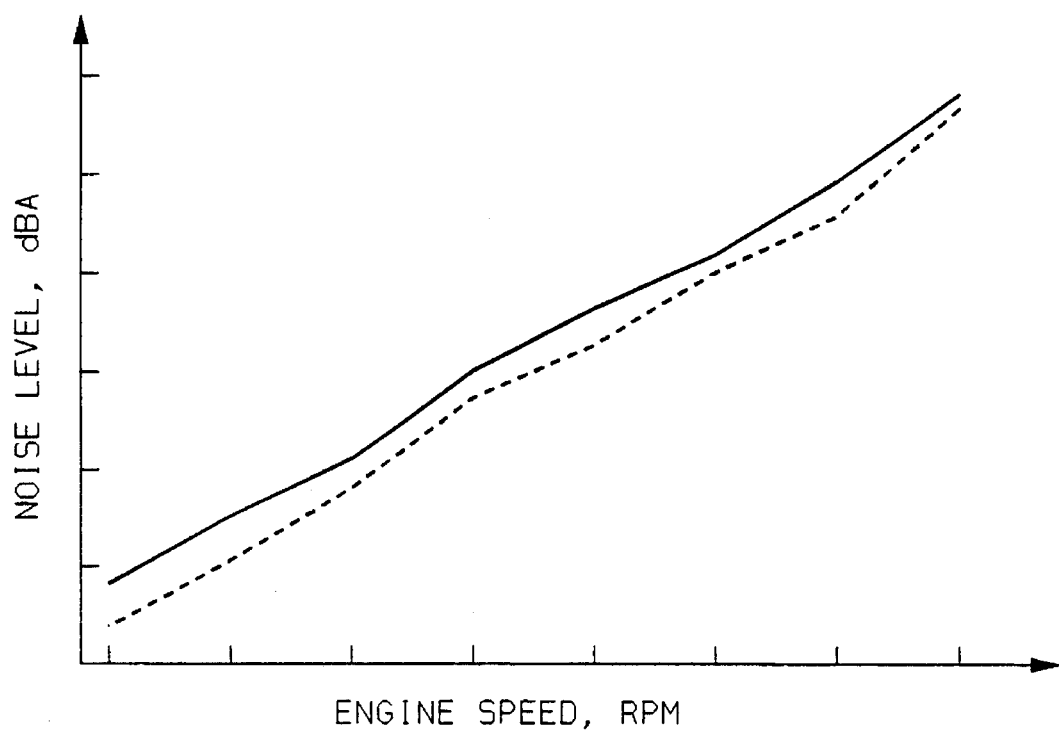
FIG. 7 is a representation of the reduction in noise level at various engine speeds which may be achieved through the application of the present invention.

In engine applications in which rotational clearance or the crankshaft 16 is not an issue with respect to the lower end of cylinder wall 14, the further embodiment of FIGS. 4–6 may prove useful. In FIG. 4, features similar to those of the embodiment described with respect to FIGS. 1 and 2 or with respect to FIG. 3, are represented by like numerals with a "double-primed" designation. The connecting rod 18" has a longitudinal axis 20" defined by a beam 22". The beam includes a central opening 44" which extends along a portion of the length of the beam from a location adjacent the piston pin bearing boss 26" to a location adjacent the crankpin bearing boss 36" to define opposing webs 46". As in the embodiment of FIG. 3, the rate of flexation is determined by the radius of curvature $R_2$ of the webs 46" which is in an outward direction, away from longitudinal axis 20" of beam 22". In order to limit the outward movement of the rod webs 46" under compressive loading, the connecting rod 18" shown in FIG. 4 includes longitudinally extending stop members, designated generally as 70 which may be formed integrally with the connecting rod and extend from the region of the crankpin bearing boss 36" at second end 34". As illustrated in FIGS. 4 and 5, each stop member includes a cantilevered beam 72 having a stop face 74 in spaced relationship to the outer side surface 76 of each web 46". During operation of the engine 10", as compressive force is applied to the connecting rod 18", the outward movement of the webs 46" is limited by contact between surfaces 76 of webs 46" and the stop faces 74 of the cantilevered beams 72.

The present invention provides an improved connecting rod for internal combustion engines requiring reduction in the noise generated by the combustion event. The preferably one piece, cast, forged or powdered metal connecting rod, includes a longitudinal opening which defines flexible legs or webs which, when acted upon by a compressive, combustion generated force, flex to absorb a portion of the force. The resulting flexation of the connecting rod webs acts to reduce peak force amplitude in the noise path.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A connecting rod for an internal combustion engine comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said webs flexible inwardly, towards said beam axis, under compressive loading of said connecting rod, to absorb a portion of the loading and thereby reduce peak force amplitude, and flexible away from said beam axis, upon reduction of the compressive loading of said connecting rod, said webs including first and second stops extending into said opening towards said axis to define a minimum opening cross section, said stops operable to limit the inward movement of said webs under compressive loading of said connecting rod, by closing of said minimum opening cross section.

2. A connecting rod for an internal combustion engine comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said webs including an inwardly radiused portion, such that said webs are flexible towards said beam axis, under compressive loading of said connecting rod, to absorb a portion of the loading and thereby reduce peak force amplitude, and flexible away from said beam axis, upon reduction of the compressive loading of said connecting rod.

3. A connecting rod for an internal combustion engine comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said webs including an outwardly radiused portion, relative to said axis, such that said webs are flexible away from said beam axis, under compressive loading of said connecting rod, to absorb a portion of the loading and thereby reduce peak force amplitude, and flexible towards said beam axis, upon reduction of the compressive loading of said connecting rod.

4. A connecting rod for an internal combustion engine comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said webs including an outwardly radiused portion, relative to said axis, such that said webs are flexible away from said beam axis, under compressive loading of said connecting rod, to absorb a portion of the loading and thereby reduce peak force amplitude, and flexible towards said beam axis, upon reduction of the compressive loading of said connecting rod and a stop member comprising a rod extending normal to said axis through openings in said webs, said rod having stops disposed at each end thereof, operable to limit the outward flexation of said webs under compressive loading of said connecting rod.

5. A connecting rod for an internal combustion engine comprising first and second ends connected by a longitudinally extending beam defining an axis, said first end including a piston pin bearing boss for receiving a piston pin of a piston therein, said second end including a crankpin bearing boss for receiving a crankpin of a crankshaft therein and said longitudinally extending beam having an opening therein defining opposing webs, said webs including an outwardly radiused portion, relative to said axis, such that said webs are flexible away from said beam axis, under compressive loading of said connecting rod, to absorb a portion of the loading and thereby reduce peak force amplitude, and flexible towards said beam axis, upon reduction of the compressive loading of said connecting rod and longitudinally extending stop members extending from said second end in spaced relationship to said opposing webs to limit the outward flexation of said webs under compressive loading.

* * * * *